(No Model.)

C. C. CARROLL.
MANUFACTURE OF DENTAL PLATES.

No. 302,890. Patented Aug. 5, 1884.

Attest,
L. W. Seely
Homer B. Harlan

Inventor,
Craft C. Carroll
by Emmarble
Attorney (No Model.)  
C. C. CARROLL.  
MANUFACTURE OF DENTAL PLATES.  
No. 302,890. Patented Aug. 5, 1884.
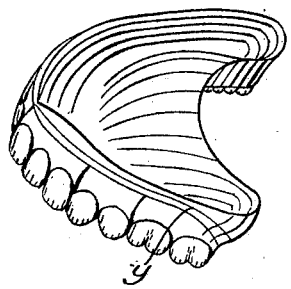
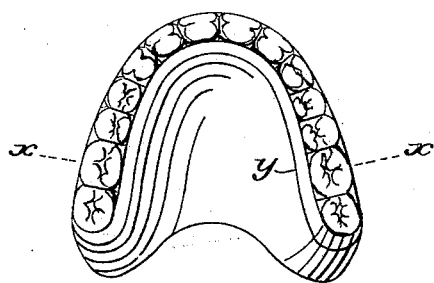
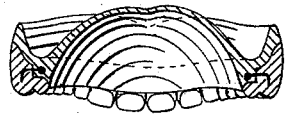

UNITED STATES PATENT OFFICE.

CRAFT C. CARROLL, OF BALTIMORE, MARYLAND.

MANUFACTURE OF DENTAL PLATES.

SPECIFICATION forming part of Letters Patent No. 302,890, dated August 5, 1884.

Application filed December 13, 1883. (No model.)

*To all whom it may concern:*

Be it known that I, CRAFT C. CARROLL, a citizen of the United States, residing at Baltimore, in the county of Baltimore and State of Maryland, have invented certain new and useful Improvements in the Manufacture of Metallic Dental Plates, of which the following is a specification, reference being had therein to the accompanying drawings.

My invention relates to improvements in the manufacture of dental plates.

The object of the invention is to produce dental plates which shall fit the mouth more perfectly than a swaged metal plate and still be extremely light; also, to provide more perfect means of securing the teeth to the plate without causing the teeth to break by the shrinkage of the plate in the operation, and in general to produce a better and more satisfactory result.

My invention consists, principally, in the peculiar process of casting a dental plate, mounting the teeth thereon, and then securing such teeth by casting a metallic connection onto the first plate and uniting the two by fusion; further, in the peculiar compound dental plate; and, finally, in details of construction, fully hereinafter described and claimed.

Figure 1:
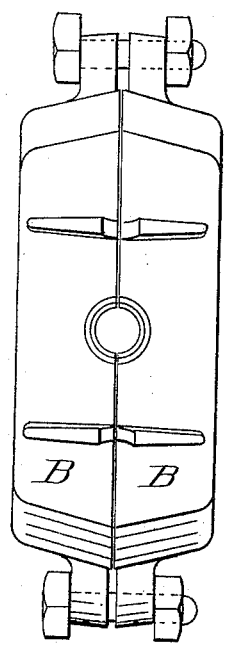
Figure 2:
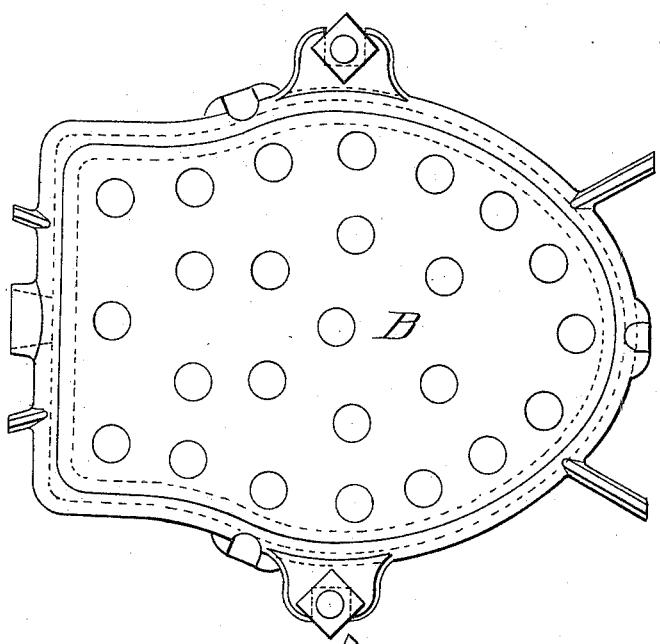
Figure 3:
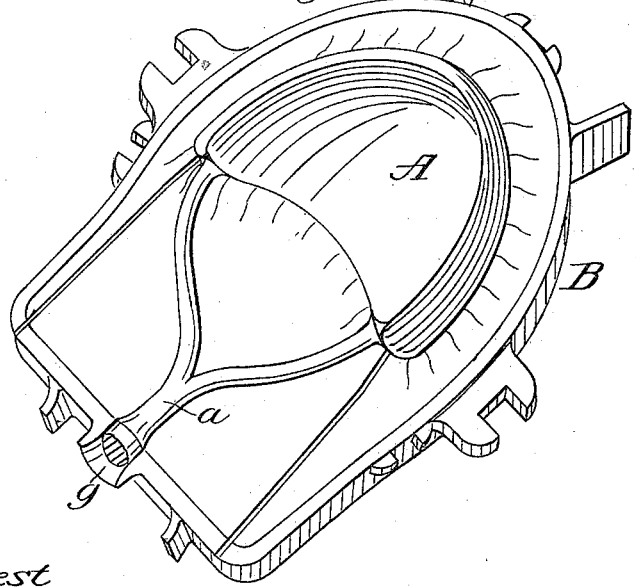

My invention is illustrated in the accompanying drawings, in which Figure 1 is an elevation of the flask containing a mold, ready for casting. Fig. 2 is a plan view of the same. Fig. 3 is a perspective view of the interior of the flask, showing the gate or sprue. Fig. 4 is a perspective view of a completely-mounted dental plate. Fig. 5 is a bottom plan of the same. Fig. 6 is a cross-section on line $x$ $x$ of Fig. 5.

In carrying out my process I first make a cast of the part of the mouth to be supplied in the ordinary manner, and on this mold form, in wax or other suitable material, a temporary base-plate which is of the exact shape of the plate to be worn. I then form around this pattern a matrix, A A, made of a composition of plaster and sand, or other suitable material, and place it in a two-part flask, B B. To form the gate or sprue $a$, a core of wax or other material extends from the mold to the pouring-point, at which point is formed a tapered socket, $g$. After this matrix has been fully set, the parts of the flask are separated, and the temporary base-plate or pattern and the wax core removed, leaving an exact impression of the plate to be cast. The flask is then bolted together and heated, in order to thoroughly dry the matrix, when the mold is ready for casting the permanent base-plate. I propose to cast this plate from aluminum, which is particularly well adapted for the purpose from its extreme lightness; but the process, as I now describe it, is applicable to other hard metals which may be used for the same purpose.

The aluminum is thoroughly melted in a suitable crucible, and is forced by pneumatic pressure into the mold, the crucible being connected to the socket $g$ at the pouring-point, and when cooled forms a perfect base-plate the exact counterpart of the mouth to be supplied. I use this cast base-plate for obtaining a proper occlusion or bite after the usual manner. The base-plate is now filled with plaster, or a composition of plaster and sand, soapstone-dust, or asbestus, and thus filled becomes a model of the mouth. I then place this model on an ordinary articulator, and, after placing a thin film of wax or other suitable plastic material over the alveolar border, I mount the teeth thereon in the ordinary manner of mounting on vulcanite, waxing them up neatly in the form in which they are intended to be worn. I then reinvest the plate so mounted in a matrix, and place it in a flask of the kind before described; then separate the flask and remove the wax, and then close the flask, as before, and dry the matrix thoroughly, ready for recasting.

I have discovered that the teeth may be firmly united to the base-plate by casting upon such plate a supplementary connection, either of aluminum, a suitable alloy of aluminum, or other compatible alloy.

So far as I am aware, it has hitherto been impossible to make a perfect union between separate parts of aluminum by casting; but I have discovered the physical conditions necessary to accomplish it, and will now describe the process.

I first heat the mold last described to a point somewhat below the fusing-point of aluminum—say from 1100° to 1200° Fahrenheit. I then melt thoroughly in a suitable crucible the proper quantity of aluminum to form the connection, and by pneumatic pressure force the fluid metal into the mold, maintaining the pressure until the metal is thoroughly cooled in the mold and the parts rigidly connected.

The success of the operation depends upon the proper temperatures of the metals, that in the mold being raised to a point just below fusing, while the metal to be cast upon it is thoroughly melted. When the casting is completed, the plate is removed and finished as intended to be worn. The appearance of the mounted plate is shown in Figs. 4, 5, and 6, where the line $y$ represents the joint between the base-plate and the supplementary cast connection. The manner of mounting the teeth on the base-plate is more particularly shown in Fig. 6.

Among the especial advantages of my improvements are, first, that by casting, the exact configuration of the mouth is given the plate, which is never perfectly accomplished by swaging; secondly, by a supplementary cast I secure a complete union of the teeth with the plate, and prevent the breaking of the teeth by contraction in cooling.

In the casting process I intend to use a crucible which forms the subject of an application for Letters Patent filed by Joseph E. Holmes, of Washington, District of Columbia, and of even date herewith, in which I hold the entire interest.

In securing the teeth to the base-plate by a cast alloy, I prefer to use an alloy described by me in an application for Letters Patent filed as of even date herewith. Where this or any other alloy is used, it is not absolutely necessary to use pneumatic pressure in casting, on account of the comparatively high specific gravity, and they may be melted in and run from any ordinary form of crucible. If desired, however, the improved crucible may be used.

Having described my invention, I claim—

1. The process of uniting aluminum to aluminum by casting, consisting in thoroughly melting the aluminum to be cast and forcing it, by pneumatic pressure, into a mold containing the other portion of aluminum, such portion being heated to a temperature of from 1100° to 1200° Fahrenheit, or somewhat below its fusing-point, substantially as described.

2. The process of making dental plates which consists in molding an aluminum or other metal base-plate, mounting the teeth thereon, heating the mounted base-plate to a temperature of from 1100° to 1200° Fahrenheit, and casting upon such mounted plate a metallic connection, the different portions of metal being chemically united by fusion.

3. A compound dental plate composed of aluminum, formed by casting one plate upon the other by fusion.

In testimony whereof I affix my signature in presence of two witnesses.

CRAFT C. CARROLL.

Witnesses:
L. W. SEELY,
HOMER B. HARLAN.